United States Patent

Vogl et al.

[11] Patent Number: 5,818,916
[45] Date of Patent: Oct. 6, 1998

[54] METHOD AND APPARATUS FOR PREVENTING RETURN DIAL TONE FRAUD IN A CELLULAR PAYSTATION

[75] Inventors: Allen W. Vogl, Melbourne, Fla.; Thomas D. Young, Snellville, Ga.; Steven E. Betts, Roswell, Ga.; Scott G. Turner, Cumming, Ga.

[73] Assignee: Technology Service Group, Roswell, Ga.

[21] Appl. No.: 493,217

[22] Filed: Jun. 20, 1995

Related U.S. Application Data

[63] Continuation of Ser. No. 137,992, Oct. 19, 1993, abandoned.

[51] Int. Cl.$^6$ .......................... H04M 11/00; H04M 17/00; H04M 3/00
[52] U.S. Cl. ............................ 379/145; 379/155; 379/189; 455/565
[58] Field of Search ................................ 379/58–63, 144, 379/145, 188, 189, 200, 112, 132, 146, 155; 455/403, 406, 407, 550, 564, 565

[56] References Cited

U.S. PATENT DOCUMENTS

| | | | |
|---|---|---|---|
| 4,759,054 | 7/1988 | Mellon | 379/145 |
| 4,782,516 | 11/1988 | Maybach | 379/189 |
| 4,837,800 | 6/1989 | Freeburg | 379/63 |
| 4,845,740 | 7/1989 | Tokuyama | 379/144 |
| 4,856,046 | 8/1989 | Streck | 379/144 |
| 4,899,373 | 2/1990 | Lee et al. | 379/144 |
| 4,935,956 | 7/1990 | Hellwarth | 379/144 |
| 4,953,198 | 8/1990 | Daly | 379/63 |
| 4,979,208 | 12/1990 | Braden et al. | 379/145 |
| 5,046,085 | 9/1991 | Grodsey | 379/112 |
| 5,220,593 | 6/1993 | Zicker | 379/59 |
| 5,233,642 | 8/1993 | Renton | 379/59 |

OTHER PUBLICATIONS

"AB3X Cellular Inferface Owner's Manual", 1987, pp. 1–17; Morrison & Dempsey Communications.

*Primary Examiner*—Curtis Kuntz
*Assistant Examiner*—Vijay Shankar
*Attorney, Agent, or Firm*—Evenson, McKeown, Edwards & Lenahan

[57] ABSTRACT

A cellular paystation system has a transceiver, paystation and an interface. The cellular paystation system operates to prevent return dial tone fraud by providing from the interface a first dial tone to a calling party using the paystation when an off-hook condition is first detected at the paystation by the interface, and then preventing another dial tone from being provided to the calling party until an on-hook condition of the calling party is detected by the interface at the paystation.

9 Claims, 3 Drawing Sheets

METHOD AND APPARATUS FOR PREVENTING RETURN DIAL TONE FRAUD IN A CELLULAR PAYSTATION

This application is a continuation of application Ser. No. 08/137,992, filed on Oct. 19, 1993, now abandoned.

FIELD OF THE INVENTION

This invention relates to interfacing paystations with a cellular network and, more particularly, to the prevention of return dial tone fraud on the part of a user in such a system.

BACKGROUND OF THE INVENTION

In most parts of the United States as well as other highly industrialized countries, optimum telephone service is provided to the population through the use of a "hardwired" or "copper" network. This type of telephone network provides a direct coupling whether using copper wires or fiber optic cables, between a calling party and a called party through various switches and exchanges. As a result, the quality of each connection is considered to be optimal.

However, hardwired networks require an extensive and costly infrastructure to provide the direct links between all telephones coupled to the system. The costs associated with installing a hardwired network over any appreciable geographic area can be exorbitant. Further, the amount of time necessary to build such a network can be very lengthy. Thus, for rural areas and less industrialized countries, or even for developing third world countries, hardwired networks are not a viable means of providing telephone service to the population. In view of this, these geographic areas and countries have looked to install cellular telephone networks to service their populations. Cellular networks are much less costly to implement as they require only the installation of transmitters and antennas at spaced geographic locations in order to provide telephone service to the population within those locations. Therefore, the need for expensive hardwired networks is eliminated.

Currently available cellular technology provides a radio transmitter and receiver, i.e. "transceiver" which couples to a cellular handset such as is common in cellular phone networks throughout the United States. One example of such a transceiver is provided by Motorola as Radio Model S2763 B. However, cellular handsets are oftentimes confusing and complicated to operate requiring more than merely the dialing of a called party's telephone number. Therefore, interfaces have been developed to provide a coupling between a cellular transceiver and a standard 2500-type desk telephone. One type of interface developed is a Motorola Cellular Connection Model S1636C. Thus, an individual can use a standard home-type telephone and yet be coupled through a cellular network.

Because of the use of the interface, the customer or user appears to have normal or ordinary hardwired telephone service while in actuality the service is being provided through a cellular network. For example, when the customer picks up his standard telephone, i.e. goes "off-hook", the interface automatically provides a dial tone to the telephone in the same manner as occurs in a hardwired network through a central office. Therefore, after receiving the dial tone, the customer merely has to dial the telephone number of the called party. After the telephone conversation is over, both the called party and calling party will generally hang up, i.e. go "on-hook", thus completing or ending the call. When this occurs, the current interfaces operate to simply wait for the calling party to again go off-hook (signalling another call is to be made) in order to again provide dial tone to the calling party.

However, sometimes the call does not go through due to a busy signal, a failure in the cellular network such as receiving a bad communication channel, there being no answer, or the cellular network being busy, etc. In these circumstances, the current interface may automatically return another dial tone to the calling party's telephone so that another call can be placed. Also, if the call has been completed and the called party hangs up but the calling party does not, the interface may also again return dial tone to the calling party in order that another call may then be placed.

While the operation of the interface to return dial tone to the calling party is in most cases desirable for an individual's own telephone service, such operation presents tremendous fraud opportunity when used in connection with a paystation coupled through the interface with a cellular network. For example, in order to provide public or paystation telephone service through a cellular network, the user of the paystation must be billed appropriately for each telephone call made. However, because the current interfaces return dial tone to the calling party in various circumstances as described above, the calling party at a paystation telephone would thus be able to place another and often times a more expensive call than the original one.

There is therefore needed a cellular paystation system that can prevent this type of user fraud.

SUMMARY OF THE INVENTION

This need is met according to the present invention by providing an interface between a cellular transceiver and a paystation telephone that operates to protect the paystation operator or "owner" from fraudulent abuse of the paystation. The present invention provides a method and apparatus for preventing the return of dial tone from the interface in those circumstances that provide an opportunity for abuse of the paystation system such as when the cellular network is busy or when the calling party does not return the handset to its cradle after the completion of a telephone call or call attempt. The present invention operates by interrupting the software routine which automatically returns the dial tone to the calling party and including a further routine to prevent the return of the dial tone until after the calling party has again gone on-hook. In this manner, dial tone is only provided once to the calling party after they go off-hook. Another dial tone is not provided until the system detects that the calling party has gone on-hook and then again gone off-hook.

Through the operation of the present invention, the paystations billing or rating scheme is allowed to operate properly by rating each separate telephone call.

It is an advantage of the present invention that customer or user fraud on the part of the calling party is prevented by requiring that the calling party go on-hook after a first telephone call is placed.

It is yet another advantage of the present invention that an improved paystation-cellular system is made available for use in rural areas and developing countries. By providing a method and apparatus for preventing return dial tone fraud problems, paystation service can be made available to such areas thus enhancing communication ability in those areas.

Other objects, advantages and novel features of the present invention will become apparent from the following detailed description of the invention when considered in conjunction with the accompanying drawings.

DETAILED DESCRIPTION OF THE DRAWINGS

Figure 1:
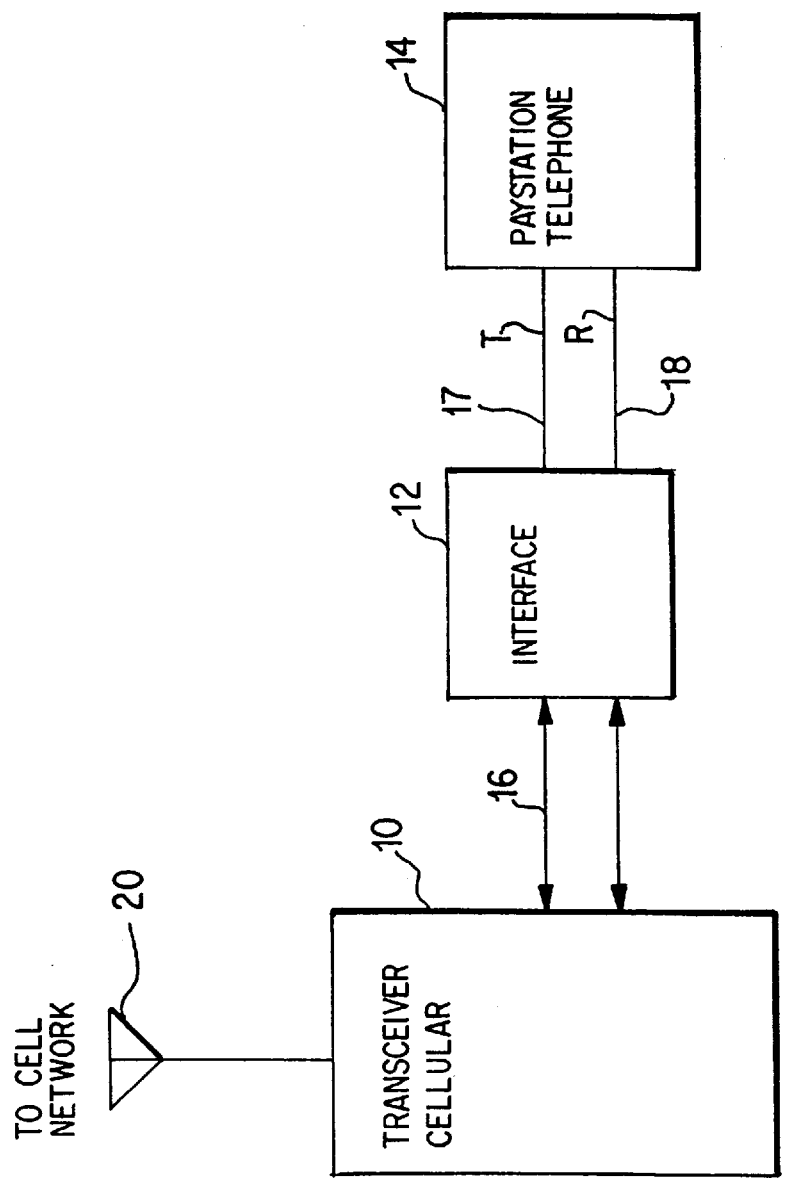
FIG. 1 is a schematic block diagram of a cellular paystation system.

Referring to FIG. 1, there is shown a schematic block diagram of a paystation telephone 14 coupled to a cellular transceiver 10 through an interface 12. The transceiver can be, for example, the Motorola Radio Model S2763B. The transceiver 10 is coupled via bus 16 to the interface 12. The interface 12 provides standard telephone tip (T) and ring (R) current 17, 18 to the paystation telephone 14. The transceiver 10 is also coupled to an antenna 20 which sends and receives the communication signals to and from the cellular network. Through the use of the interface 12, such as a Motorola Cellular Connection Model S1636C, the paystation telephone 14 can function as a standard paystation telephone wherein the cellular network to which it is coupled is transparent to the user.

The interface 12 can include a software controlled microprocessor for interfacing the cellular transceivers' commands received over bus 16 with the inputs received over tip/ring conductors 17, 18 from the paystation telephone 14.

Figure 2:
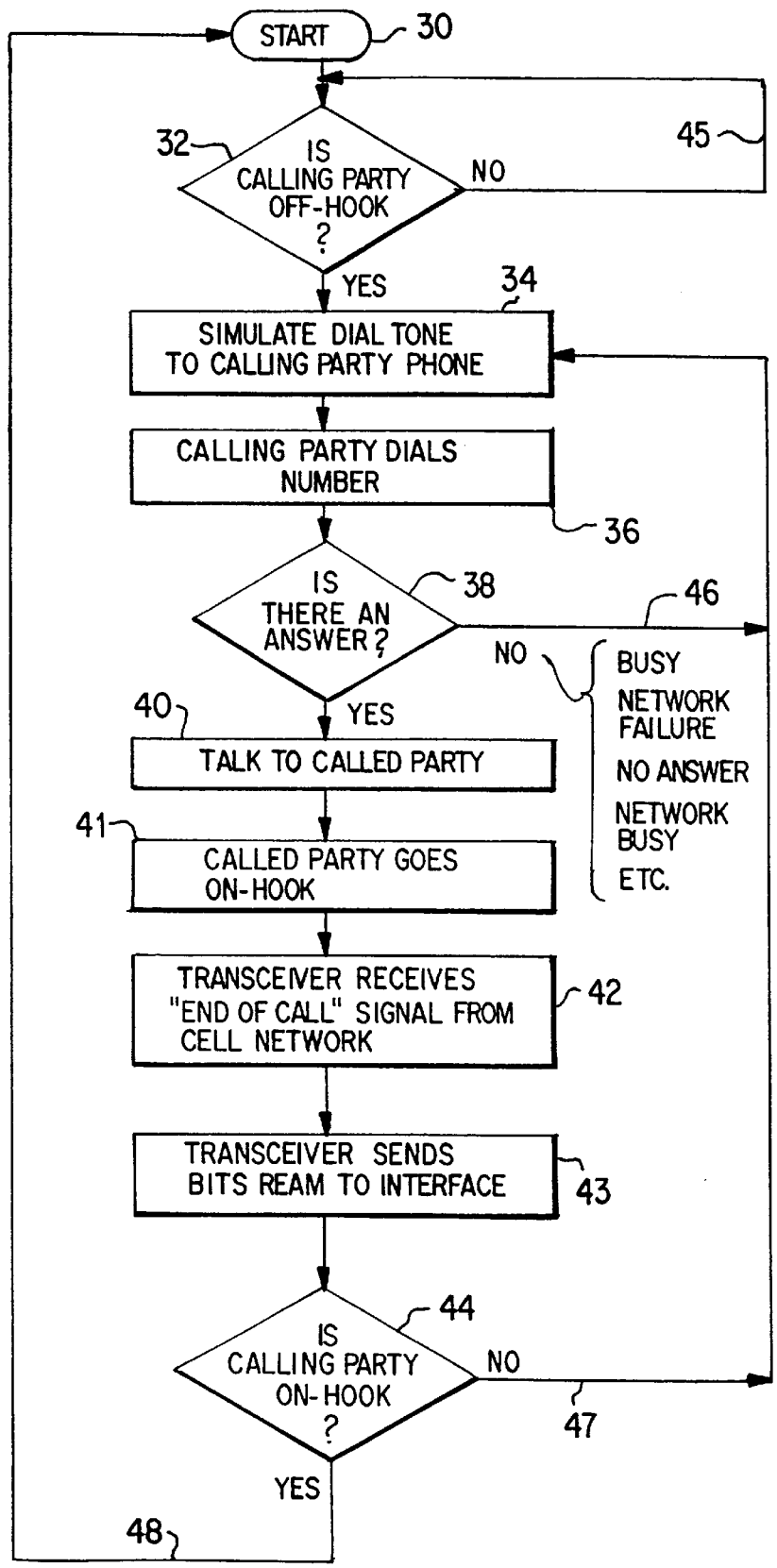
FIG. 2 is a flow diagram illustrating the operation of the prior art interface.

Prior art FIG. 2 provides a software flowchart generally indicating the flow sequence of a telephone call. For example, step 30 indicates the beginning of the system operation. The system initially determines whether the calling party, i.e. the paystation telephone 14, has gone off-hook (step 32). If not, then the system continues to wait for the off-hook indication as noted by loop 45 in FIG. 2. If the calling party has gone off-hook, then the interface 12 simulates a dial tone to the calling party's phone 14 (step 34) and enables the dual tone multi-frequency signalling capability, i.e. DTMF.

At this point, the calling party is able to dial the telephone number for the called party (step 36). The interface 12 then determines whether there is an answer by the called party (step 38). If there is an answer, then the call is properly connected and the calling party may converse with the called party (step 40). Once the conversation is completed, the called party then goes back on-hook (step 41).

However, at step 38, if there is not an answer, then as indicated by loop 46, the interface 12 returns to step 34 and again simulates dial tone to the calling party's phone and enables the DTMF signalling. This return of dial tone to the calling party presents the source of fraud when used in connection with a paystation telephone 14 as described in the background of the invention section. Any number of reasons may exist for why there is no answer at step 38. For example, it could simply be that the called party is not available to answer the phone. Alternatively, the called party's phone may be busy, there may be a cellular network failure such as the connection to a poor or garbled communication channel, the network itself may be busy (i.e., no channels available), etc.

After the called party goes on-hook at step 41, the cellular network will transmit an "end of call" signal to the transceiver 10 (step 42). The transceiver 10 then sends a bit stream via bus 16 to the interface 12 (step 43) indicating the "end of call signal" from the cellular network. At this point, the interface determines whether the calling party has gone on-hook (step 44). The prior art interface will return the dial tone to the calling party at step 34 once the call is completed at step 41 if the calling party does not then go on-hook (step 44). In this event, as indicated by loop 47, the interface 12 automatically returns dial tone to the calling party so that he may place another call. Again, this is unacceptable when used with a paystation telephone 14 where each individual call must be properly paid for depending upon numerous factors, i.e. type of call, location of call, time of day, etc. Finally, if the calling party does go on-hook at step 44 when the conversation is completed, then the system reverts to the start step 30 as indicated by line 48.

Figure 3:
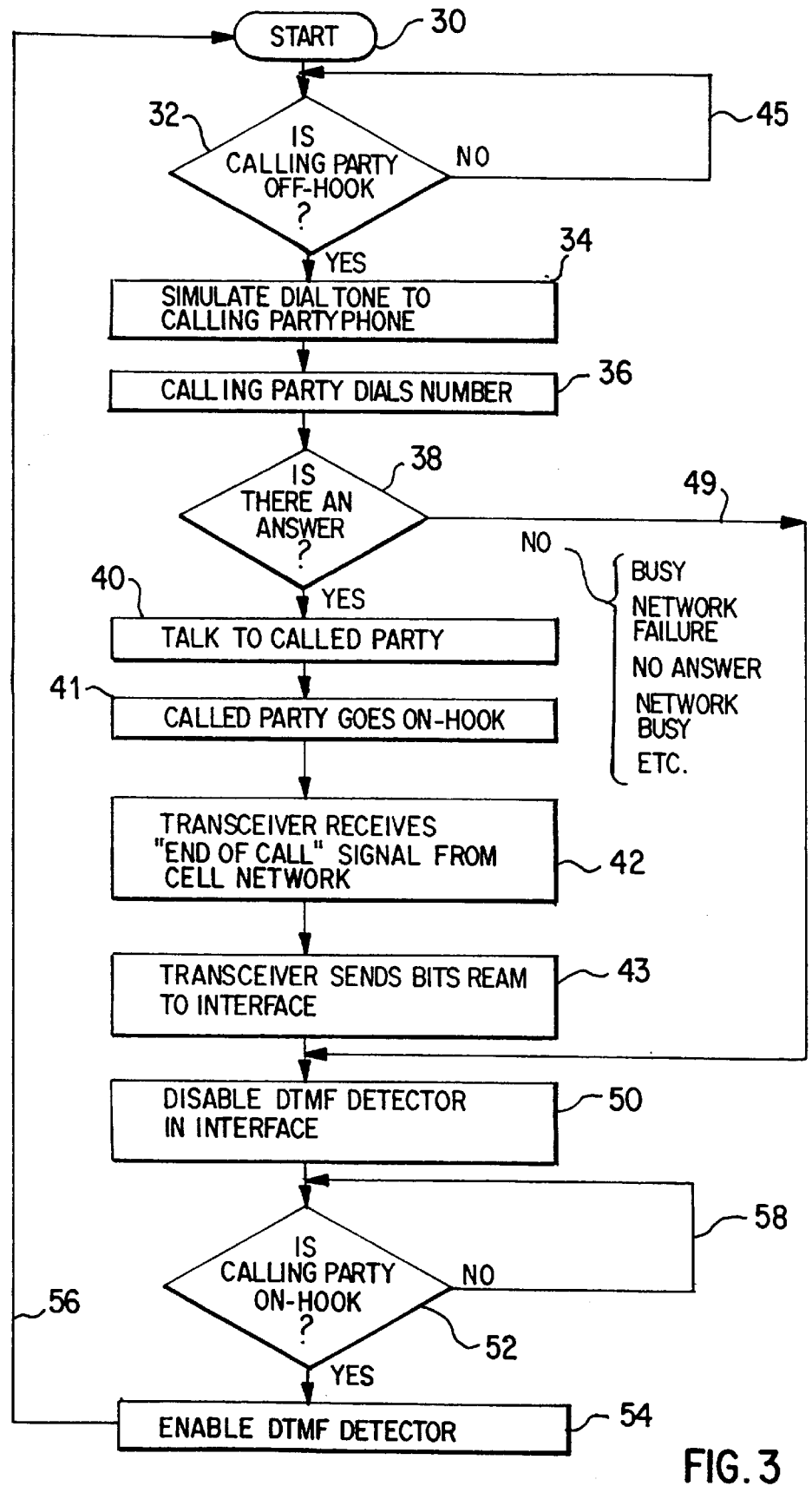
FIG. 3 is a flow diagram illustrating the operation of the present invention.

Referring to FIG. 3, there is shown a general flowchart for the software according to the present invention. It should be noted that like reference numerals have been used to correspond with corresponding steps in FIG. 2. The interface 12 according to the present invention operates by beginning at step 30 and determining whether the calling party, i.e the paystation telephone 14 user, has gone off-hook (step 32). If not, then the system continues to wait for the initiation of a call as indicated by loop 45. When the calling party has gone off-hook, then the interface 12 simulates dial tone to the calling party (step 34) and enables DTMF signalling. At this point, the calling party is then able to dial the telephone number for the called party (step 36).

If there is an answer (step 38) by the called party, then the telephone call is connected and a conversation may take place (step 40). Once the conversation is completed, the called party then goes back on-hook (step 41). Again, after the called party goes on hook, the transceiver receives an "end of call" signal from the cellular network (step 42). The transceiver then sends a bit stream to the interface 12 (step 43) providing the end of call signal. The "end of call" signal can be, for example, a flag that is set within the bit stream sent by the transceiver to the interface. Upon receiving the end of call signal within the bit stream, the interface disables its DTMF detector (step 50). By doing this, the paystation telephone's 14 DTMF signalling cannot be detected, thus preventing another call from being placed.

The interface 12 then determines whether the calling party has gone back on-hook at step 52. If the calling party has gone back on-hook, then the interface again enables the DTMF detector (step 54) and the system reverts to step 30 as indicated by line 56 to await another off-hook situation of the paystation telephone 14 (step 32). However, if the calling party has not gone on-hook at step 52, then the interface enters a wait loop 58 until the calling party goes back on-hook. Because of this operation, dial tone is not returned to the calling party as was done in the prior art. Therefore, the calling party is not able to defraud the paystation telephone by placing a subsequent call without additional payment.

Returning to step 38 wherein the system awaits an answer on the part of the calling party, if there is no answer, then the system loops as indicated by line 49 to step 50 and disables the DTMF detector in the interface. Again, several reasons may exist for why there is no answer on the part of the called party as discussed above. Because of the operation of the present invention, dial tone is not returned to the calling party and DTMF detection is disabled if there is no answer by the called party. Therefore, this eliminates the ability to place a subsequent fraudulent call.

The present invention thus prevents fraudulent callers who may use the paystation telephone initially to place a free call such as a "1-800" or "411" number, and then wait for the return dial tone before placing a "pay" call. Further, the fraudulent caller no longer can simply place an inexpensive local call and then, by not going back on-hook, receive another dial tone to place a much more expensive call.

The interface 12 operates in accordance with its software pursuant to the present invention to determine that an end of call flag within the bit stream sent to the interface has been set, and then operates to disable the DTMF signalling (step 50). The software then determines whether the calling party has gone back on-hook (step 52). If not, the software continues to wait for the calling party to go on-hook as indicated by loop 58. However, if the calling party does go back on-hook, then the system software operates to enable DTMF detection (step 54). Once enabled, then the system determines whether the calling party has gone off-hook which would indicate that another call is to be placed (step 32).

If the calling party has not gone off-hook, then the system continues to wait for the next call as indicated by line 45. If another call is going to be placed as determined by the calling party going off-hook, then the system software operates to simulate the dial tone (step 34) and enable another call to be placed.

While the present invention has been disclosed with a software implementation, it would be possible to develop a hardware solution using the principles taught herein.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a cellular paystation system having a cellular transceiver communicating with a cellular network, a standard paystation, and an interface providing simulated dial tones to the standard paystation, a method of operating the cellular paystation system to prevent return dial tone fraud, the method comprising the steps of:

providing from the interface a first simulated dial tone to a calling party using the standard paystation to place a first call through the cellular network when an off-hook condition is first detected at the standard paystation by the interface;

preventing a second call from being placed by the calling party through the cellular network until an on-hook condition of the calling party at the standard paystation is detected by the interface.

2. A method according to claim 1 wherein the step of preventing, further comprises the steps of:

reading a bit stream from the transceiver;

determining when a status indicator in the bit stream indicates an end of call signal from the transceiver;

disabling dual tone multi-frequency signalling for the interface when the end of a call signal is detected;

waiting for the calling party to go on-hook before re-enabling dual tone multi-frequency signalling.

3. A method according to claim 2, further comprising the steps of:

determining when the calling party has gone off-hook; and providing from the interface another dial tone to the calling party indicating that another call can be placed.

4. A cellular paystation system, comprising:

a cellular transceiver communicating with a cellular network;

an interface directly coupled to said transceiver for providing simulated dial tones;

a standard paystation directly coupled to said interface over a tip/ring conductor pair; and wherein said interface includes means for providing from the interface a first simulated dial tone to a calling party using the standard paystation to place a first call through the cellular network when an off-hook condition is first detected at the standard paystation by the interface and means for preventing a second call from being placed by the calling party through the cellular network until an on-hook condition of the calling party at the standard paystation is detected by the interface, whereby return dial tone fraud is prevented.

5. A system according to claim 4, further comprising:

means for reading a bit stream from the transceiver;

means for determining when a status indicator in the bit stream indicates an end of call signal from the transceiver;

means for disabling dual tone multi-frequency signalling for the interface when the end of a call signal is detected; and means for waiting for the calling party to go on-hook before re-enabling dual tone multi-frequency signalling.

6. A system according to claim 5, further comprising:

means for determining when the calling party has gone off-hook; and means for providing from the interface another dial tone to the calling party indicating that another call can be placed.

7. A system according to claim 4, wherein said means for preventing prevents said second call from being placed when a first call attempt by the calling party is unsuccessful due to one of: no answer by a called party; called party busy; cellular network busy; and a network failure.

8. A method according to claim 1, wherein the step of preventing operates by preventing a second simulated dial tone from being provided to the calling party until the on-line condition of the calling party at the paystation is detected by the interface.

9. A system according to claim 4, wherein said means for preventing a second call from being placed by the calling party includes means for preventing a second simulated dial tone from being provided to the calling party.

* * * * *